Jan. 20, 1959  G. HERRMANN  2,869,946
LIGHT ALLOY PISTON FOR INTERNAL COMBUSTION ENGINES
Filed Jan. 23, 1957

INVENTOR
Gerhard Herrmann

United States Patent Office 2,869,946
Patented Jan. 20, 1959

2,869,946

LIGHT ALLOY PISTON FOR INTERNAL COMBUSTION ENGINES

Gerhard Herrmann, Stuttgart-Bad Cannstatt, Germany, assignor to Mahle Kommandit-Gesellschaft, Stuttgart-Bad, Cannstatt, Germany Application January 23, 1957, Serial No. 635,862

3 Claims. (Cl. 309—13)

This invention relates to a light alloy piston for internal combustion engines. In particular, the invention is directed to a piston whose body is composed of a piston head having a ring section and an integral skirt with no separation between the skirt and the ring section of the piston head. Likewise, no expansion slits are used at the pin boss section, and the pin bosses are formed in one piece with the piston skirt in such a way that the driving forces on the piston head are directly transmitted to the pin bosses.

The objects of the invention are to produce a lightweight piston having a skirt free from non-uniform heat expansions, and sufficiently flexible to be self-adjusted to heat deformations which are created in operating the piston in a cylinder, and with the piston skirt portions being sufficiently supported to withstand adequately the side thrust pressures.

In general, the lightweight object of the piston is obtained either by cutouts in the piston skirt extending from beneath the piston pin bosses to the open end of the skirt or by constructing the skirt with a wall thickness which is less than two percent of the piston diameter. A non-uniform heat expansion of the skirt is avoided by forming the skirt zone between the piston head and pin bosses of annular cross-section and without including any local material accumulation. Especially omitted are the piston struts ordinarily used between the piston head and the pin bosses. The bosses are exclusively supported by struts extending toward the lower edge of the skirt. These struts are positioned transversely of the boss axis and extend between the inner ends of the pin bosses and the open end of the side thrust portions of the skirt in the form of chords and so that an open space remains between the struts and the inside of the skirt throughout the length of the struts.

Pistons having cutout skirt portions are sometimes necessary in two-stroke engines for controlling the intake and exhaust gases. Again, in four-stroke engines, pistons having cutout skirts or relatively thin skirt walls have been used for the purpose of reducing the piston weight and to obtain a smooth, flexible fit between the skirt and the cylinder wall, which construction requires a piston tightly fitted in the cylinder. In practice, such pistons actually had small cutouts in the skirts, together with a tight cylinder fit; but even in this construction, it was found that the piston portion where the skirt joins with the ring section was subject to considerable wear, the avoidance of which would require more clearance which is not desired in this piston portion.

Furthermore, in the prior thin skirt pistons, strong struts were used to connect the piston head to the pin bosses. Although such struts provided good reinforcement for the pin bosses, with a good transmission of the thrust forces from the piston head to the bosses and piston pin, connecting rod and crank shaft, such struts also transferred considerable heat from the piston head to the pin bosses and consequently too strongly heated the pin bosses and the adjacent sections of the skirt. This resulted in that the radial heat expansion of the piston was greater in the direction of the piston pin axis than at right angles thereto. To compensate for this distortion, the piston was cam ground to an elliptical shape. In addition, the local overheating at the pin bosses affected the lubrication and the play of the piston pin holding the connecting rod.

To avoid the above disadvantages, it has been suggested to replace the above-described struts by struts extending from the pin bosses toward the open end of the skirt. Such a piston did not have the pin bosses formed in one piece with the piston skirt, and therefore differed from the instant invention. In other words, the pin bosses were connected with the skirt only by means of the struts. A transmission of forces from the piston head was through a considerable distance in traveling through the whole length of the skirt and then through the struts to the pin bosses. This piston required a very strong construction of all its various parts in order to take care of the push-pull and bending forces and therefor contradicted the purpose of a light and flexible construction.

The instant invention prevents this disadvantage. The force transmitted is from the piston head only through the portion of the skirt wall adjacent the pin bosses, and this portion is essentially the necessarily formed ring section. The adjacent connecting skirt portion is necessary only for carrying the sideways sliding pressure. Consequently, this skirt portion can be of very thin construction without danger, because the skirt wall is sufficiently supported by the struts extending toward the pin bosses. These struts not only prevent the bending of the open end portion of the skirt walls, but also reduce the above-noted wear previously experienced adjacent the ring section. This is because in the prior constructions the wear was probably due to the stiff skirt walls which were longitudinally pressed outwardly adjacent the ring section to the same degree that the lower skirt portions were pressed inwardly by the sliding pressure.

The means by which the objects of the invention are obtained are described more fully with reference to the accompanying drawings, in which.

Figure 1:
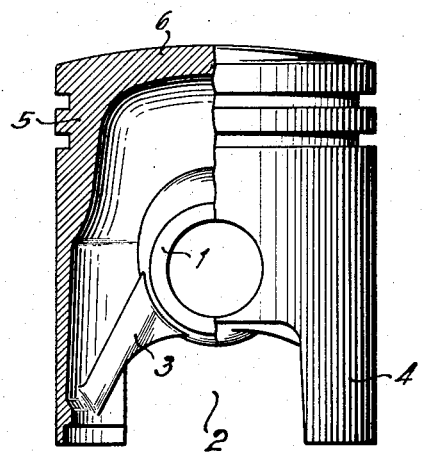
Figure 1 is a vertical elevational view of the piston partly in section.
Figure 2:
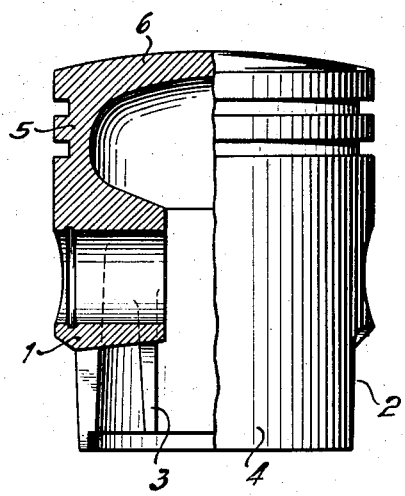
Figure 2 is a similar view taken at a right angle to Figure 1.

The invention is illustrated for a two-stroke engine piston. Beneath the pin bosses 1 are cutouts 2 in the wall of the skirt. Struts 3 extend from the lower open end side thrust surface portions of the skirt 4 to the pin bosses and are directed transversely of the pin boss axis.

The chord shaped struts are separated throughout their length from the inside surface of the skirt between their end connections to the skirt and pin bosses. The usual support of the pin bosses against the piston head are omitted. Also omitted are slits or other openings separating the skirt and piston head over the region between the pin bosses, so that the gas pressure thrust from the piston head is transferred directly through ring section 5 to the pin bosses 1, and from there to the connecting pin and rod. Support struts 3 have the exclusive job of taking the piston side thrust pressures perpendicular to the pin boss axis and on the lower end of the skirt. They are thus particularly suitable as they lie in planes parallel to the pressure forces and extend transversely across the piston. The desired flexibility of the skirt is not affected noticeably in the direction of the pin boss axis flexibility of struts 3.

Having now described the means by which the objects of the invention are obtained,

I claim:

1. A light metal alloy piston for internal combustion engines comprising an integral one piece piston body having a piston head and an open-ended unslit skirt, pin bosses directly and integrally joined to said skirt with the piston body between the piston head and pin bosses being free from bracing struts, said skirt having a thin wall, tendon-shaped struts extending as chords from the inner ends of said pin bosses to the free end of said skirt, and said struts being directed transversely of said bosses and toward the side thrust surfaces, respectively, of the piston and being separated throughout their lengths from the inner surface of said skirt.

2. A piston as in claim 1, further comprising cutouts in said skirt beneath said pin bosses.

3. A piston as in claim 1, further comprising a skirt wall thickness less than two percent of the piston diameter.

References Cited in the file of this patent

UNITED STATES PATENTS

| Re. 17,193 | Day | Jan. 15, 1929 |
| 1,646,998 | Gill | Oct. 25, 1927 |
| 1,752,685 | Mitchell | Apr. 1, 1930 |

FOREIGN PATENTS

| 436,365 | Great Britain | Apr. 9, 1934 |